EFNER & SPERRY.
Spring.
No. 29,866.
Patented Sept. 4, 1860.
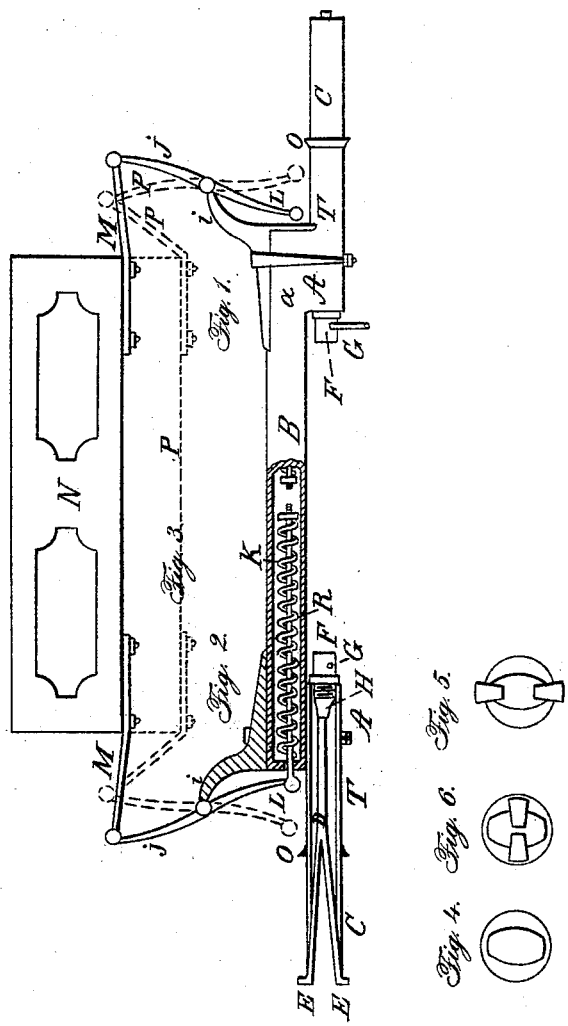
Witnesses:
Inventor.

UNITED STATES PATENT OFFICE.

G. W. EFNER AND SAML. A. SPERRY, OF ANN ARBOR, MICHIGAN.

CARRIAGE.

Specification of Letters Patent No. 29,866, dated September 4, 1860.

*To all whom it may concern:*

Be it known that we, GEORGE W. EFNER and SAMUEL A. SPERRY, of the city of Ann Arbor, county of Washtenaw and State of Michigan, have invented a new and useful Improvement in Carriages for Common Roads; and we do hereby declare that the following is a full and exact description thereof, reference being had to the accompanying drawings and to the letters of reference marked thereon.

The nature of our invention consists in providing in connection with hollow tubular axles a new and useful carriage spring and also in connection with such axles a new and useful mode of attaching and detaching the wheels of vehicles.

To enable others skilled in the art to make and use our invention we will proceed to describe its construction and operation.

We construct our axles as well as the other parts of our vehicle which is usually made of solid wood or iron of metal tubing.

The drawing, marked Figures 1 and 2, is intended to represent the rear end of a carriage body with the axle arms, springs, connections, &c., without the wheels. The left hand part, marked Fig. 2 is intended to represent the interior of the axle arm connections, springs, fastenings, &c., exposed to view, in Fig. 3, the dotted lines showing the situation of the body, &c., when depressed by the load, and the operation of the springs; Fig. 4, the elliptical opening in the end of the arm to receive and hold the apparatus that constitutes the wheel fastening. Fig. 5 shows the same with the fastening expanded to hold the wheel in place. Fig. 6 shows the same with the fastening contracted to permit the wheel to pass on or off.

"A" is the connection or coupling between the body of the axle and the arms.

"B" is the body of the axle; "C" the arms of the axle for the wheel to run on; "D," the double spring catch inside of the arm, and extending out to hold the wheel in its place; E E, the catches which extend beyond the surface, or end of the arm, and which (when the double spring is expanded by being turned into the longest diameter of the elliptical opening) constitutes the fastening to the wheel, and which when turned into the shortest diameter of the elliptical opening allows the wheel to pass off or on.

F, is the knob or head at the inside end of the arm, with a hole "G" in it to receive a lever or wrench to turn the spring within the arm in attaching or detaching the wheel.

H, is a screw in the arm near the head of the spring catch to hold the catch in its place.

I is the jack or part of the connection extending upward and outward, with a jaw at the end for the upright spring lever J to play in the jack; may contain a female screw and be screwed on or fastened to the bolster or body of the axle and kept from turning by a set screw or otherwise fastened.

K is a spiral spring in the body of the axle, but india rubber or any other kind of spring that can be used within the hollow axle may be substituted.

L is the head of the rod running through the spring to which the lower end of the spring lever is attached.

M is the thorough brace to which N, the body of the carriage is hung.

P P P P indicate the position of the carriage body and the springs when the pressure on the springs is greatest.

O is the shoulder on the arm for the inner end of the hub to run against.

R and S, show where the axle and arms are connected.

T is the neck of the arm between the hub and connection.

In addition to the use of the spring catch D and elliptical opening for fastenings for wheels it may be used for coupling cars, or for fastening gates, draws, or other purposes, and by beveling the outer ends or corners of the catches, the wheel or other thing to be fastened, coupled, or locked with, will in passing on readily compress the spring catches when at their greatest expansion so as to slip over the shoulders of the catches.

What we claim as our invention, and desire to secure by Letters Patent is—

1. The hollow axle B in combination with the double spring catch D and the manner of operating the same by turning the spring within the elliptical opening at the outer end of the axle as a mode of attaching and detaching the wheel.

2. The hollow axle B in combination with spiral spring K, spring lever J and thorough brace "M" operating together in the manner above described as a carriage spring.

G. W. EFNER.
S. A. SPERRY.

Witnesses:
E. W. MOYER,
E. L. BOYDEN.